UNITED STATES PATENT OFFICE.

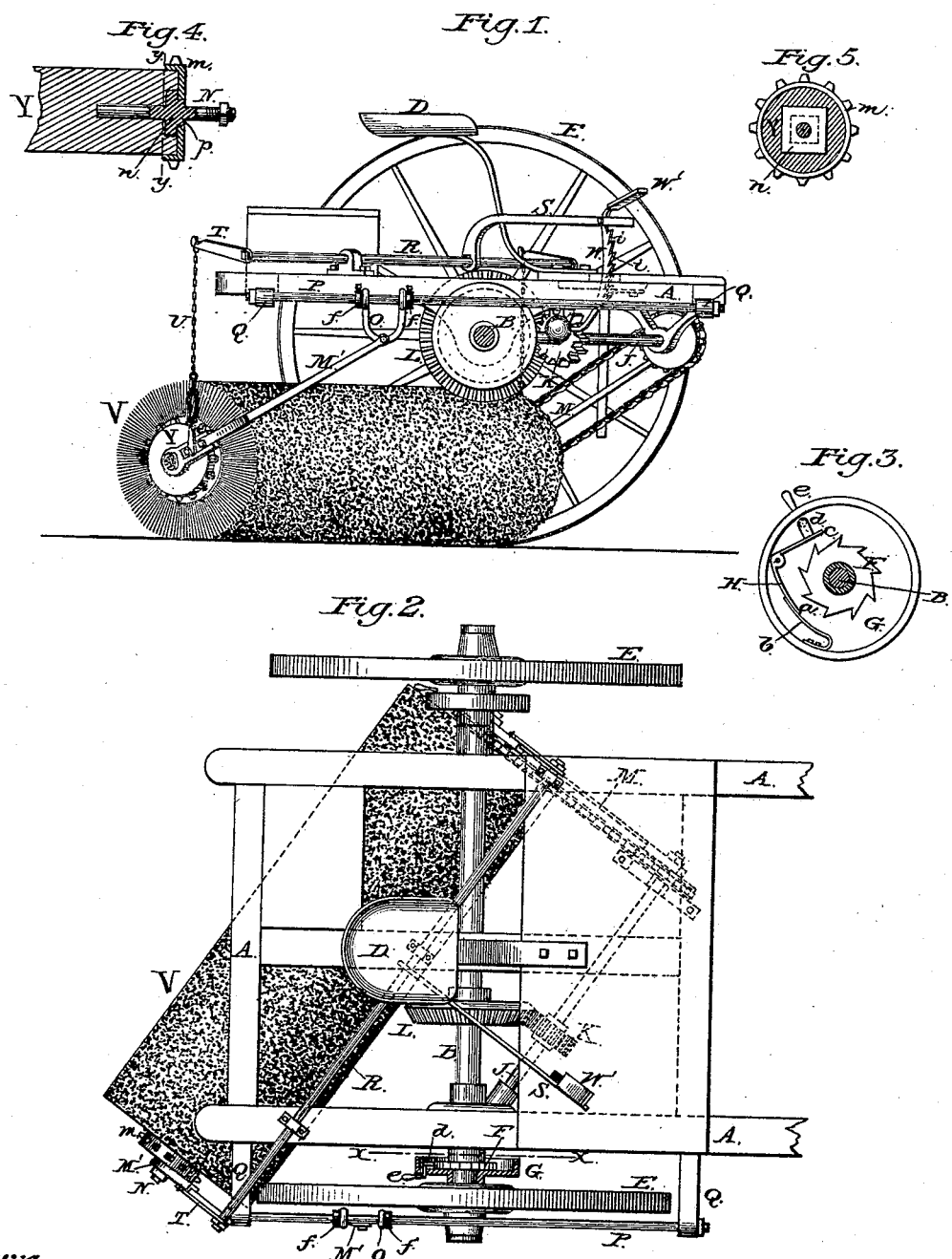

CHARLES Z. O'NEILL, OF NEW YORK, N. Y., ASSIGNOR TO THE CHAPMAN-O'NEILL MANUFACTURING COMPANY, OF SAME PLACE.

STREET-SWEEPING MACHINE.

SPECIFICATION forming part of Letters Patent No. 270,834, dated January 16, 1883.

Application filed September 18, 1882. (No model.)

*To all whom it may concern:*

Be it known that I, CHARLES Z. O'NEILL, of the city, county, and State of New York, have invented a new and useful Improvement in Street-Sweeping Machines; and I do hereby declare that the following is a full and exact description thereof, reference being had to the accompanying drawings, and to letters of reference marked thereon, making a part of this specification.

My invention relates to street-sweeping machines constructed with a rotating broom; and it consists in novel improvements in the suspension of the rotating broom, the control of the lever for raising and lowering the broom, the connection and disconnection of the driving-wheels from the driving shaft or axle, and in the attachment to the broom-block of its journal-pins or gudgeons, all as hereinafter fully described, the object of my invention being to simplify the machine and ease its movements.

In the accompanying drawings, Figure 1 is a side elevation of my improved street-sweeping machine with the nearest wheel removed and the axle in section; Fig. 2, a plan view of the machine with the ratchet-case secured to the wheel at one end in section; Fig. 3, a detached section in line $x\ x$ of Fig. 2, showing the ratchet device in elevation; Fig. 4, a detached central longitudinal section of one end of the broom-block, illustrating the attachment thereto of its gudgeons and cap-plates, Fig. 5 being a transverse section of same on line $y\ y$, Fig. 4.

A represents the frame of my street-sweeping machine; B, the axle, upon which the frame is properly mounted in the usual manner; V, a broom formed upon a rotating cylindrical shaft or broom-block, Y; D, the driver's seat, mounted upon a spring-bar secured to the central beam of the frame over the axle; E, the wheels, fitted to turn loosely upon the ends of the axle.

A disk or collar, F, Fig. 3, armed with ratchet-teeth upon its periphery, is secured to the axle at each end thereof, inside of each wheel D, and these ratchet-disks are each encircled by a cylindrical case, G, which is very firmly secured to the inner end of the hub of the wheel, so as to project therefrom and revolve therewith over the ratchet-disk. (See the section thereof in Fig. 2.)

A bent lever, H, is pivoted at its elbow or angle to the inner side of the case G, so that one arm, $a$, thereof (see Fig. 3) may bear against the rim of the ratchet-disk, and serve as a pawl to engage the ratchet-teeth, its automatic engagement therewith being enforced by a spring, $b$. The opposite arm, $c$, is engaged by a short arm, $d$, projecting from the inner end of the axis of a lever or handle, $e$, on the outside of the case G, said axis being journaled in the case through which it passes, so that its inner arm, $d$, is actuated and turned with said axis by a corresponding movement of the outer lever, $e$. The arm $d$ is so adjusted with reference to the arm $c$ of the ratchet-lever H that when the outer lever, $e$, is thrown out in a radial position (see Fig. 3) the inner arm, $d$, will force inward the arm $c$ of the lever H, and thereby withdraw its opposite arm, forming the pawl $a$, from contact with the ratchet-disk F, leaving thereby the wheel to which the case G is secured free to turn independently of the axle B. When, however, the lever $e$ is turned at a right angle to a radial line passing through its axis from the center of the case G, its inner arm will drop back from the lever H, and the pawl $a$, under the influence of the spring $b$, will engage the ratchet-disk, so that when the wheel E turns forward it will produce a corresponding rotation of the axle B.

A driving-shaft, J, is supported in suitable bearings under the frame A in front of the axle at an angle therewith corresponding to the angle at which the revolving broom V is to be set, and is geared to the axle by means of a pinion, K, meshing into a beveled wheel, L, upon the axle, in the customary manner.

The broom-block Y is swung at the rear of the frame in a line parallel with the driving-shaft J upon arms M M′, whose outer ends furnish bearings for the gudgeons N at either end of the broom-block, upon which the broom rotates. The inner end of one of the arms, M, is pivoted upon the outer end of the driving-shaft J in the customary manner; but the inner end of the outer arm, M′, instead of being pivoted upon the end of the axle on that side of the machine, as has heretofore been done in machines of this class, is pivoted to a shackle, O, swinging freely upon a rod or bar, P, supported firmly by means of brackets Q Q at the side of the frame outside of the wheel, as illustrated in Figs. 1 and 2 of the drawings. The shackle O is free to move horizontally upon the rod P, but is confined, when properly adjusted, by means of collars $f\,f$, which are secured on each side thereof by means of set-screws engaging the rod. The arm M' is bent in its length so that it shall extend parallel with the side of the frame until it reaches the broom, and thence continue in line parallel with the end of the broom until it intersects its axis. The broom V is elevated and lowered, as required, by means of a rock-shaft, R, supported in suitable bearings on the top of the frame in line parallel with the axis of the broom, and a lever, S, which projects forward from the rock-shaft to a point within reach of the driver's foot. At either end of the rock-shaft R arms J J are secured to project rearwardly over the bearings of the broom, the arms and bearings being connected by suspension-chains U U, carried from the axial bearings of the broom to the ends of said arms. (See Fig. 1.) The curved arm W is pivoted to the end of the lever S to depend therefrom. A pedal, W', is formed upon the upper end of the arm above its fulcrum, and so bent that pressure thereon shall operate to swing the lower end of the arm backward, while a weight secured to said lower end (see Fig. 1) operates automatically to swing it forward. The front edge of the arm W is provided with upwardly-inclined teeth $i\,i$, Fig. 1, adapted to engage the edge of a catch-plate upon the side of an aperture in the platform of the machine through which the arm depends, so that when the lever S is depressed by a pressure thereon of the driver's foot to elevate the broom the teeth $i\,i$, borne automatically by the influence of the weight on the lower end of the arm W against said plate, will by engaging it confine and hold fast the lever S, and consequently uphold the broom at any desired point. When it is desired to drop the broom the teeth are instantly disengaged by a pressure of the driver's foot upon the pedal W', which will operate, as described, to swing the lever W and its teeth $i\,i$ back from the edge of the retaining or catch plate. The broom is geared to the driving-shaft J by means of a sprocket-wheel on the end of the shaft and a chain passing thence over the rim of the toothed cap-plate $m$ on the end of the broom-block Y.

Instead of being secured into the broom-block or fastened by screws or bolts thereto, as has heretofore been the case, the gudgeons N of the broom are each secured to the broom-block by means of a rectangular flange, $n$, formed about midway of the length of the gudgeon, and which is made to fit closely into a counterpart rectangular recess in the end of the broom-block, the inner end of the gudgeon being fitted into a central aperture or socket extending inwardly from said rectangular recess, as illustrated in Fig. 4.

A rectangular offset, $p$, upon the outer face of the rectangular flange $n$ serves to engage and confine the outer toothed cap-plate, $m$, which is formed with a central rectangular aperture to fit said offset.

I claim as my invention—

1. The combination, with a rotating broom, in a street-sweeping machine, and with the arm M', carrying the outer or diverging end of the broom, of a swinging shackle, O, suspended at that end of the machine in a line coinciding with the axis of the driving-shaft and parallel with the axis of the broom, substantially in the manner and for the purpose herein set forth.

2. The combination, with the frame A and the rotating broom V of a street-sweeping machine, of the rod P, brackets Q Q, adjustable swinging shackle O, and arm M', substantially in the manner and for the purpose herein set forth.

3. The combination, with the frame A and rotating broom V of a street-sweeping machine, and with the lever S, rock-shaft R, arms T, and suspension-chains U, serving to elevate the broom, as required, of a weighted toothed arm, W, pivoted to the end of the lever S, and adapted to engage automatically a catch-plate on the frame to hold the lever, and to be disengaged from said plate by pressure upon a pedal, W', at its upper end to release the lever, all substantially in the manner and for the purpose herein set forth.

4. The combination, in a street-sweeping machine, with the ratchet-disk F upon the axle, the cylindrical case C, secured to the hub of the wheel and encircling said ratchet, and a spring-actuated pawl, H, pivoted within the case to engage said ratchet, of a lever-arm, $c$, projecting from the pivoted end of the pawl, a lever, $e$, pivoted on the outside of the case, and an arm, $d$, secured within the case to the pivotal axis of the lever $e$ to bear upon the end of the lever $e$, substantially in the manner and for the purpose herein set forth.

5. The combination, with the broom-block Y, broom V, driving-shaft J, axle B, and intermediate gear, and with a gudgeon, N, serving as a journal for the broom, of a rectangular flange, $n$, upon said gudgeon, fitting into a counterpart recess in the end of the broom-block and formed with a rectangular offset, $p$, adapted to engage a rectangular aperture in a toothed cap-plate, $m$, fitted upon the end of the broom-block and geared to the driving-shaft, all substantially in the manner and for the purpose herein set forth.

In testimony whereof I have signed my name to this specification in the presence of two subscribing witnesses.

CHAS. Z. O'NEILL.

Witnesses:
DAVID A. BURR,
E. E. BAGLEY.